(12) United States Patent
Sasaki

(10) Patent No.: US 11,942,592 B2
(45) Date of Patent: Mar. 26, 2024

(54) BATTERY MODULE

(71) Applicant: TOYOTA JIDOSHA KABUSHIKI KAISHA, Toyota (JP)

(72) Inventor: Manabu Sasaki, Hashima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/389,620

(22) Filed: Jul. 30, 2021

(65) Prior Publication Data

US 2022/0085403 A1    Mar. 17, 2022

(30) Foreign Application Priority Data

Sep. 11, 2020 (JP) .................................. 2020-152872

(51) Int. Cl.
*H01M 10/04* (2006.01)
*H01M 4/02* (2006.01)
(Continued)

(52) U.S. Cl.
CPC .......... *H01M 10/045* (2013.01); *H01M 4/78* (2013.01); *H01M 50/466* (2021.01); *H01M 50/512* (2021.01); *H01M 50/533* (2021.01); *H01M 50/538* (2021.01); *H01M 2004/025* (2013.01); *H01M 50/531* (2021.01)

(58) Field of Classification Search
CPC ...... H01M 10/045; H01M 10/04; H01M 4/78; H01M 50/466; H01M 50/538; H01M 50/103; H01M 50/533; H01M 50/512; H01M 50/531; H01M 2004/025; H01M 10/0459; H01M 10/0583; H01M 10/125
See application file for complete search history.

(56) References Cited

U.S. PATENT DOCUMENTS

2005/0069768 A1  3/2005 Martinet et al.
2007/0196732 A1* 8/2007 Tatebayashi ............ B60L 50/61
429/162

(Continued)

FOREIGN PATENT DOCUMENTS

CN    1596483 A    3/2005
JP    9-17441 A    1/1997
(Continued)

*Primary Examiner* — Matthew T Martin
*Assistant Examiner* — Adam J Francis
(74) *Attorney, Agent, or Firm* — Sughrue Mion, PLLC

(57) ABSTRACT

A battery module includes: a positive electrode member having a positive electrode current collector, a first positive electrode active material layer, and a second positive electrode active material layer; a negative electrode member having a negative electrode current collector, a first negative electrode active material layer, and a second negative electrode active material layer; and a separator. The positive electrode current collector has a positive electrode folded-back portion. The negative electrode current collector has a negative electrode folded-back portion. The first negative electrode active material layer constitutes a first electrode together with the first positive electrode active material layer. The second negative electrode active material layer constitutes a second electrode connected in parallel with the first electrode together with the second positive electrode active material layer.

5 Claims, 9 Drawing Sheets

(51) Int. Cl.
*H01M 4/78* (2006.01)
*H01M 50/466* (2021.01)
*H01M 50/512* (2021.01)
*H01M 50/531* (2021.01)
*H01M 50/533* (2021.01)
*H01M 50/538* (2021.01)

(56) References Cited

U.S. PATENT DOCUMENTS

| | | | | |
|---|---|---|---|---|
| 2009/0081541 | A1* | 3/2009 | Kelley | H01M 50/545 |
| | | | | 429/185 |
| 2011/0177383 | A1* | 7/2011 | Culver | H01M 50/40 |
| | | | | 429/211 |
| 2013/0157111 | A1* | 6/2013 | Chami | H01M 10/0413 |
| | | | | 429/157 |
| 2014/0045040 | A1 | 2/2014 | Chami | |
| 2015/0194265 | A1 | 7/2015 | Sugiyama | |
| 2018/0083255 | A1* | 3/2018 | Kim | H01M 50/105 |
| 2019/0074510 | A1* | 3/2019 | Zhang | H01M 4/485 |
| 2020/0328449 | A1* | 10/2020 | Ohta | H01M 10/0404 |
| 2021/0265703 | A1* | 8/2021 | Kim | H01M 10/0459 |
| 2022/0393223 | A1* | 12/2022 | Yun | H01M 50/15 |

FOREIGN PATENT DOCUMENTS

| | | |
|---|---|---|
| JP | 10-79254 A | 3/1998 |
| JP | 2015-130370 A | 7/2015 |
| JP | 2016-110856 A | 6/2016 |
| JP | 2020-024827 A | 2/2020 |
| WO | WO-2020060022 A1 * 3/2020 | ........ H01M 10/0413 |

* cited by examiner

BATTERY MODULE

This nonprovisional application is based on Japanese Patent Application No. 2020-152872 filed on Sep. 11, 2020 with the Japan Patent Office, the entire contents of which are hereby incorporated by reference.

BACKGROUND

Field

The present disclosure relates to a battery module.

Description of the Background Art

For example, Japanese Patent Laying-Open No. 2020-24827 discloses a bipolar battery including an electrode stacked body having a plurality of bipolar electrodes stacked with a separator being interposed therebetween, and a frame body that surrounds the electrode stacked body. Each bipolar electrode has a current collector, a positive electrode made of a positive electrode active material formed on one surface of the current collector, and a negative electrode made of a negative electrode active material formed on the other surface of the current collector.

SUMMARY

In the bipolar battery described in Japanese Patent Laying-Open No. 2020-24827, it is difficult to achieve both an increased capacity and an improved output within a predetermined mounting area. For example, in the bipolar battery described above, capacity is increased by increasing the number of the stacked bipolar electrodes (i.e., increasing the thickness), whereas output is decreased due to an increase in internal resistance. On the other hand, the resistance is decreased by decreasing the thickness of each active material layer, and thereby output is improved, but capacity is decreased.

An object of the present disclosure is to provide a battery module that can achieve an increased capacity and an improved output within a predetermined mounting area.

A battery module according to one aspect of the present disclosure is a battery module with a plurality of electrodes connected in parallel with each other, the battery module including: a positive electrode member having a positive electrode current collector, a first positive electrode active material layer provided on the positive electrode current collector, and a second positive electrode active material layer provided on the positive electrode current collector; a negative electrode member having a negative electrode current collector, a first negative electrode active material layer provided on the negative electrode current collector, and a second negative electrode active material layer provided on the negative electrode current collector; and a separator arranged between the positive electrode member and the negative electrode member, the positive electrode current collector having a positive electrode folded-back portion in which the positive electrode current collector is folded back so that the first positive electrode active material layer and the second positive electrode active material layer are aligned in a thickness direction of the first positive electrode active material layer, the negative electrode current collector having a negative electrode folded-back portion in which the negative electrode current collector is folded back so that the first negative electrode active material layer and the second negative electrode active material layer are aligned in a thickness direction of the first negative electrode active material layer, the first negative electrode active material layer being arranged so as to face the first positive electrode active material layer, thereby constituting a first electrode together with the first positive electrode active material layer, the second negative electrode active material layer being arranged so as to face the second positive electrode active material layer, thereby constituting a second electrode connected in parallel with the first electrode together with the second positive electrode active material layer, the separator having a first interposed portion interposed between the first positive electrode active material layer and the first negative electrode active material layer, and a second interposed portion interposed between the second positive electrode active material layer and the second negative electrode active material layer.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
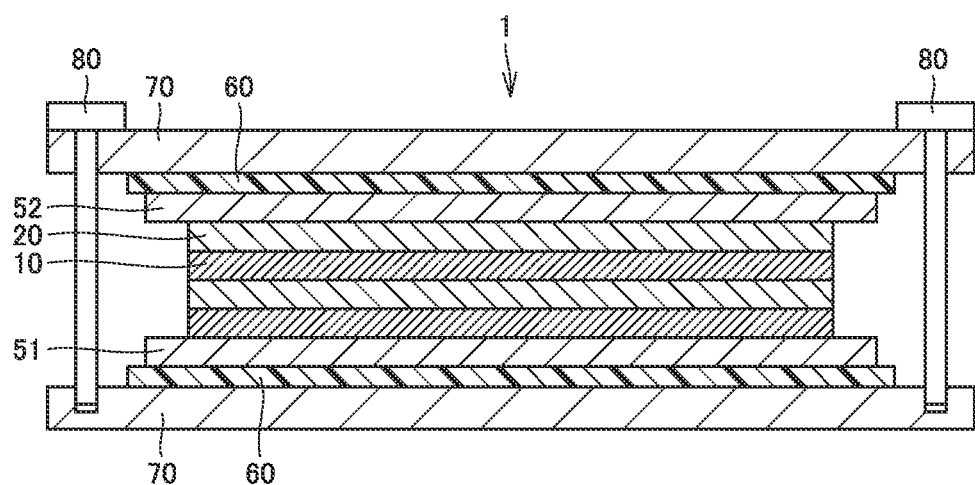
FIG. 1 is a cross sectional view schematically showing a configuration of a battery module in a first embodiment of the present disclosure.

Embodiments of the present disclosure will be described with reference to the drawings. It should be noted that, in the drawings referred to below, identical or corresponding members will be designated by the same reference numerals.

First Embodiment

Figure 2:
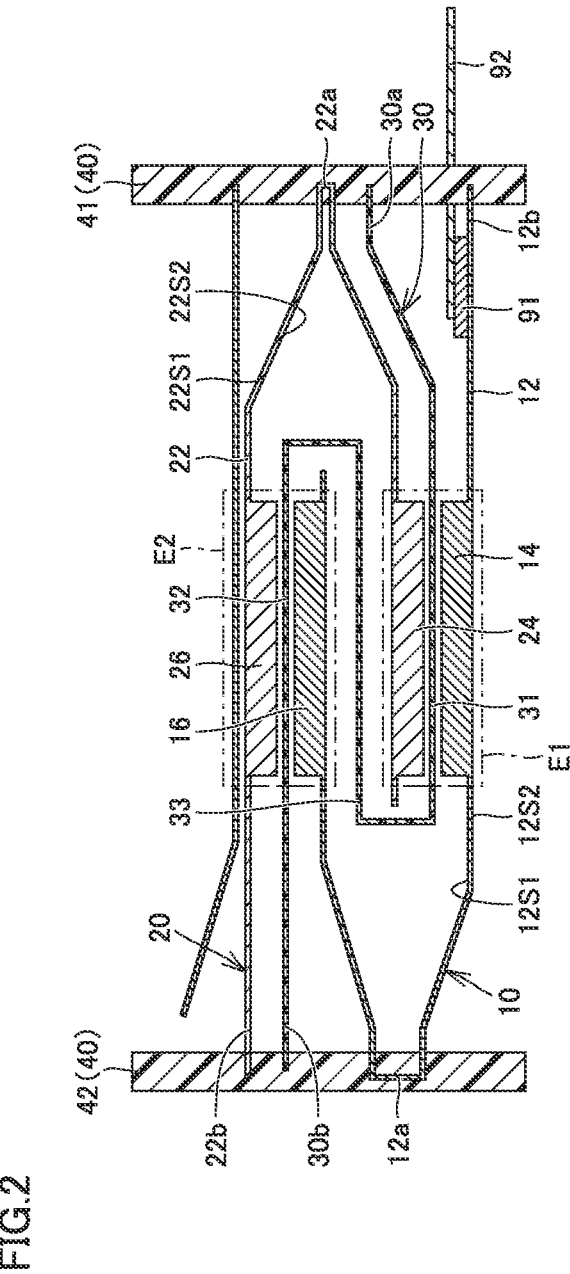
FIG. 2 is a cross sectional view schematically showing a configuration of a positive electrode member and a negative electrode member.

FIG. 1 is a cross sectional view schematically showing a configuration of a battery module in a first embodiment of the present disclosure. FIG. 2 is a cross sectional view schematically showing a configuration of a positive electrode member and a negative electrode member. This battery module 1 is mounted, for example, on a lower surface of a floor of a vehicle.

As shown in FIGS. 1 and 2, battery module 1 includes a positive electrode member 10, a negative electrode member 20, a separator 30, a frame member 40, a positive electrode current collecting plate 51, a negative electrode current collecting plate 52, insulating members 60, restraining plates 70, and restraining members 80. In this battery module 1, a plurality of electrodes are connected in parallel with each other. It should be noted that, in FIG. 1, the illustration of separator 30 and frame member 40 is omitted.

As shown in FIG. 2, positive electrode member 10 has a positive electrode current collector 12, a first positive electrode active material layer 14, and a second positive electrode active material layer 16. Positive electrode member 10 has a shape extending long in a direction of depth of the sheet plane in FIG. 2.

Positive electrode current collector 12 is formed in the shape of a thin film. In the present embodiment, positive electrode current collector 12 is made of aluminum foil. Positive electrode current collector 12 has a first main surface 12S1, and a second main surface 12S2 opposite to first main surface 12S1.

First positive electrode active material layer 14 is provided on positive electrode current collector 12. In the present embodiment, first positive electrode active material layer 14 is provided on first main surface 12S1 of positive electrode current collector 12. First positive electrode active material layer 14 is formed by applying a positive electrode active material on first main surface 12S1.

Second positive electrode active material layer 16 is provided on positive electrode current collector 12. In the present embodiment, second positive electrode active material layer 16 is provided on a portion of second main surface 12S2 of positive electrode current collector 12 which does not overlap with first positive electrode active material layer 14 in a thickness direction of first positive electrode active material layer 14. Second positive electrode active material layer 16 is formed by applying the positive electrode active material on second main surface 12S2. The thickness of second positive electrode active material layer 16 is set to be the same as the thickness of first positive electrode active material layer 14.

As shown in FIG. 2, positive electrode current collector 12 has a positive electrode folded-back portion 12a. Positive electrode folded-back portion 12a is a portion in which positive electrode current collector 12 is folded back so that first positive electrode active material layer 14 and second positive electrode active material layer 16 are aligned in the thickness direction of first positive electrode active material layer 14.

Positive electrode current collecting plate 51 is connected to a portion of second main surface 12S2 of positive electrode current collector 12 which overlaps with first positive electrode active material layer 14 in the thickness direction.

Negative electrode member 20 has a negative electrode current collector 22, a first negative electrode active material layer 24, and a second negative electrode active material layer 26. Negative electrode member 20 has a shape extending long in the direction of depth of the sheet plane in FIG. 2.

Negative electrode current collector 22 is formed in the shape of a thin film. In the present embodiment, negative electrode current collector 22 is made of copper foil. Negative electrode current collector 22 has a first main surface 22S1, and a second main surface 22S2 opposite to first main surface 22S1.

First negative electrode active material layer 24 is provided on negative electrode current collector 22. In the present embodiment, first negative electrode active material layer 24 is provided on first main surface 22S1 of negative electrode current collector 22. First negative electrode active material layer 24 is formed by applying a negative electrode active material on first main surface 22S1. The thickness of first negative electrode active material layer 24 is set to be the same as the thickness of first positive electrode active material layer 14. First negative electrode active material layer 24 is arranged so as to face first positive electrode active material layer 14, thereby constituting a first electrode E1 together with first positive electrode active material layer 14.

Second negative electrode active material layer 26 is provided on negative electrode current collector 22. In the present embodiment, second negative electrode active material layer 26 is provided on a portion of second main surface 22S2 of negative electrode current collector 22 which does not overlap with first negative electrode active material layer 24 in a thickness direction of first negative electrode active material layer 24. Second negative electrode active material layer 26 is formed by applying the negative electrode active material on second main surface 22S2. The thickness of second negative electrode active material layer 26 is set to be the same as the thickness of first negative electrode active material layer 24. Second negative electrode active material layer 26 is arranged so as to face second positive electrode active material layer 16, thereby constituting a second electrode E2 connected in parallel with first electrode E1 together with second positive electrode active material layer 16.

As shown in FIG. 2, negative electrode current collector 22 has a negative electrode folded-back portion 22a. Negative electrode folded-back portion 22a is a portion in which negative electrode current collector 22 is folded back so that first negative electrode active material layer 24 and second negative electrode active material layer 26 are aligned in the thickness direction of first negative electrode active material layer 24.

Negative electrode current collecting plate 52 is connected to a portion of first main surface 22S1 of negative electrode current collector 22 which overlaps with second negative electrode active material layer 26 in the thickness direction.

As shown in FIG. 1, positive electrode current collecting plate 51 and negative electrode current collecting plate 52 are restrained by restraining plates 70 from both sides in a stacking direction of electrodes E1 and E2, with insulating members 60 being interposed therebetween. Restraining members 80 fasten restraining plates 70. In the present embodiment, bolts are used as restraining members 80.

Separator 30 is arranged between positive electrode member 10 and negative electrode member 20. Separator 30 is formed in the shape of a sheet. Separator 30 is formed of a porous film, a nonwoven fabric, or the like. Separator 30 has a first interposed portion 31, a second interposed portion 32, and a coupling portion 33.

First interposed portion 31 is interposed between first positive electrode active material layer 14 and first negative electrode active material layer 24.

Second interposed portion 32 is interposed between second positive electrode active material layer 16 and second negative electrode active material layer 26.

Coupling portion 33 couples first interposed portion 31 and second interposed portion 32. Coupling portion 33 is arranged to pass between first electrode E1 and second electrode E2. Specifically, coupling portion 33 passes between second main surface 22S2 of negative electrode current collector 22 and first main surface 12S1 of positive electrode current collector 12, and couples first interposed portion 31 and second interposed portion 32.

Frame member 40 is made of an insulator such as a synthetic resin. Frame member 40 is formed annularly. Frame member 40 has a first frame portion 41 and a second frame portion 42.

First frame portion 41 is arranged on one side in an orthogonal direction orthogonal to a direction in which first positive electrode active material layer 14 and first negative electrode active material layer 24 face each other (i.e., the stacking direction of the electrodes). First frame portion 41 has a shape extending along a direction orthogonal to both of the stacking direction and the orthogonal direction.

Second frame portion 42 is arranged on the other side in the orthogonal direction. Second frame portion 42 faces first frame portion 41. Second frame portion 42 has a shape extending along the direction orthogonal to both of the stacking direction and the orthogonal direction.

As shown in FIG. 2, one end portion 12b of positive electrode current collector 12 is fixed to first frame portion 41. A plate 91 made of Ni or the like and a substrate (for example, a flexible printed substrate) 92 are connected to one end portion 12b for voltage detection. Positive electrode folded-back portion 12a is fixed to second frame portion 42.

One end portion 22b of negative electrode current collector 22 is fixed to second frame portion 42. Negative electrode folded-back portion 22a is fixed to first frame portion 41.

One end portion 30a of separator 30 is fixed to first frame portion 41. More specifically, one end portion 30a is fixed to a portion of first frame portion 41 located between one end portion 12b of positive electrode current collector 12 and negative electrode folded-back portion 22a. The other end portion 30b of separator 30 is fixed to second frame portion 42. More specifically, the other end portion 30b is fixed to a portion of second frame portion 42 located between positive electrode folded-back portion 12a and one end portion 22b of negative electrode current collector 22.

Next, steps of stacking positive electrode member 10 and negative electrode member 20 will be described with reference to FIG. 3.

First, first positive electrode active material layer 14 and first negative electrode active material layer 24 are arranged to face each other with first interposed portion 31 being interposed therebetween. Thereby, first electrode E1 is constituted by first positive electrode active material layer 14 and first negative electrode active material layer 24.

Figure 3:
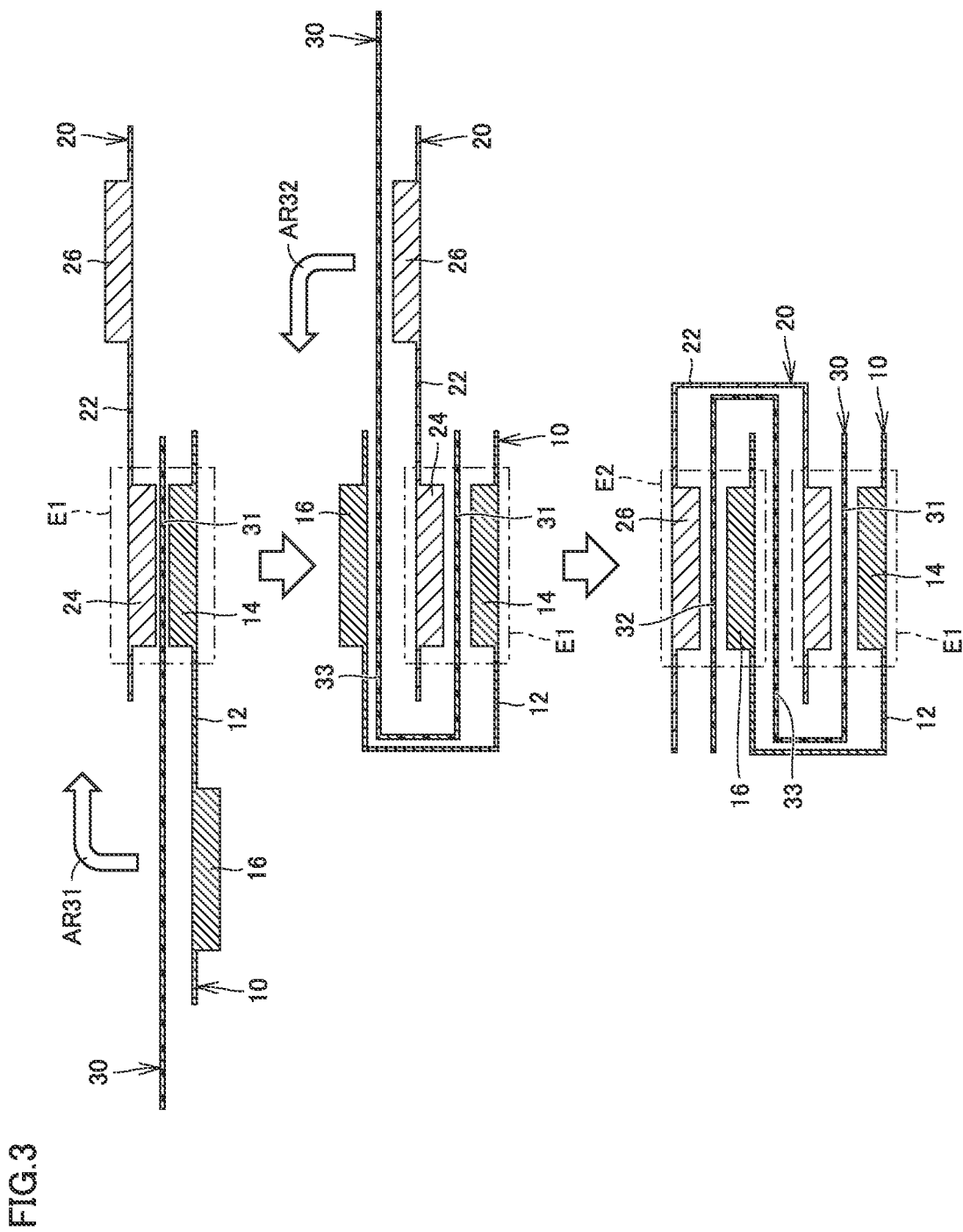
FIG. 3 is a view schematically showing steps of stacking the positive electrode member and the negative electrode member.

Then, as indicated by an arrow AR31 in FIG. 3, separator 30 is folded back so that separator 30 faces second main surface 22S2 of negative electrode current collector 22, and positive electrode current collector 12 is folded back so that second positive electrode active material layer 16 overlaps with first positive electrode active material layer 14 in the thickness direction.

Thereafter, as indicated by an arrow AR32 in FIG. 3, separator 30 is folded back so that separator 30 faces second positive electrode active material layer 16, and negative electrode current collector 22 is folded back so that second negative electrode active material layer 26 faces second positive electrode active material layer 16 with second interposed portion 32 being interposed therebetween. Thereby, second electrode E2 is constituted by second positive electrode active material layer 16 and second negative electrode active material layer 26.

Subsequently, the steps of stacking positive electrode member 10 and negative electrode member 20 will be described in more detail with reference to FIGS. 4 to 10. It should be noted that, in FIGS. 4 to 10, a portion of frame member 40 is omitted.

Figure 4:
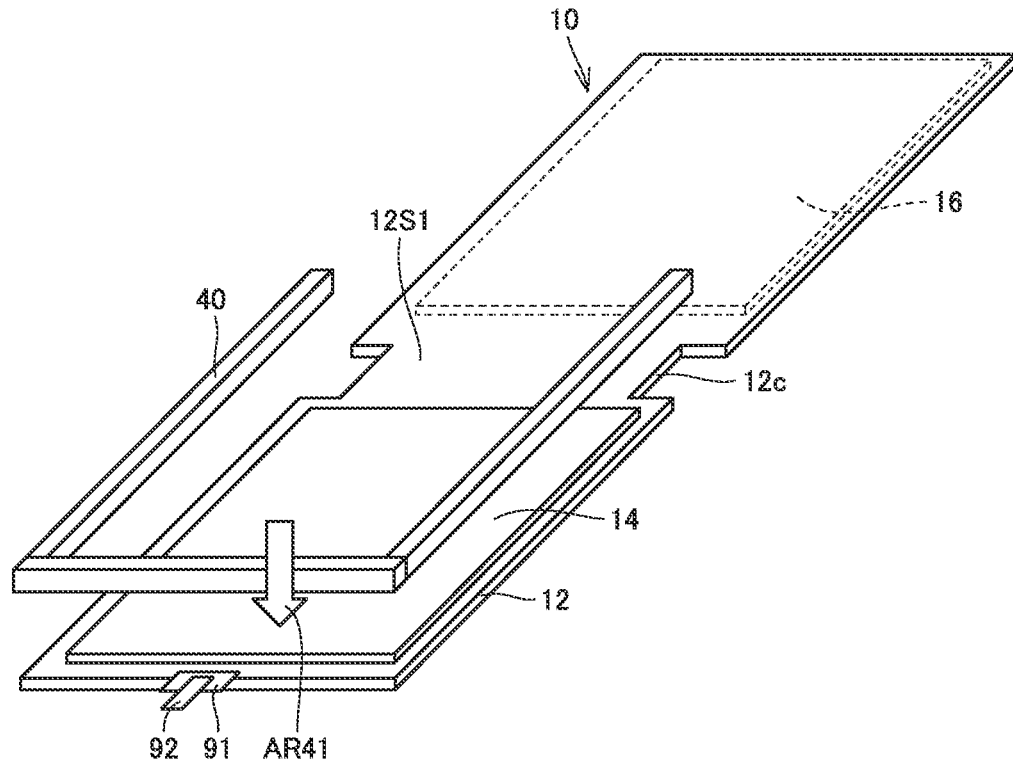
FIG. 4 is a perspective view showing a step of arranging a frame member on the positive electrode member.

First, as shown in FIG. 4, a portion of frame member 40 is placed around first positive electrode active material layer 14 on first main surface 12S1 of positive electrode current collector 12. It should be noted that positive electrode current collector 12 has notches 12c for avoiding interference with frame member 40.

Figure 5:
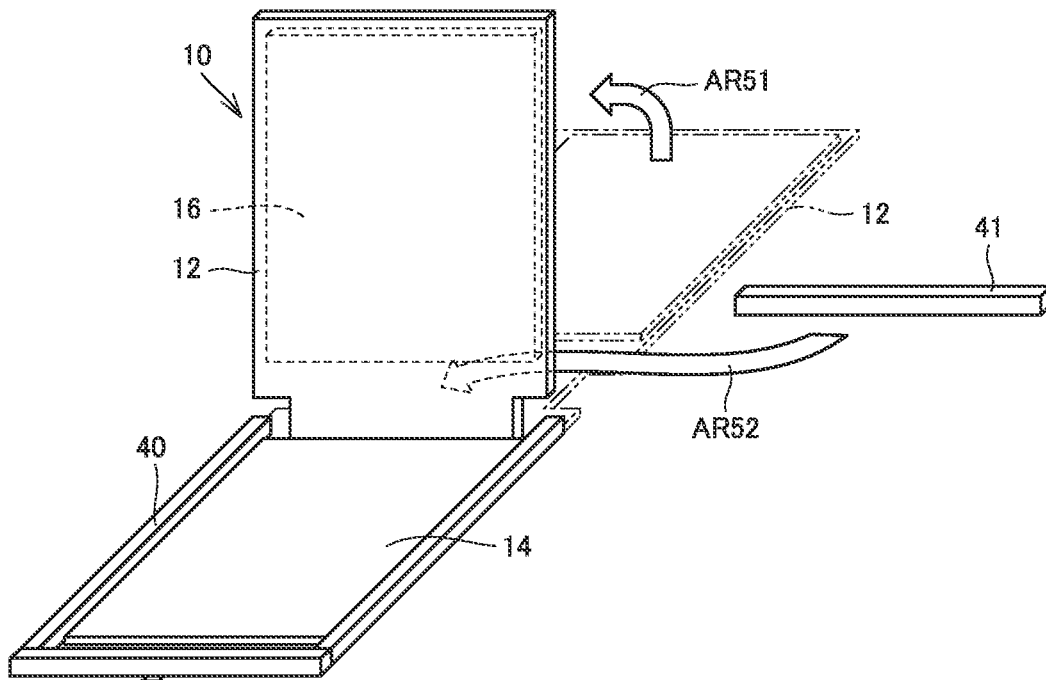
FIG. 5 is a perspective view showing a step of arranging the frame member on the positive electrode member.

Then, as indicated by an arrow AR51 in FIG. 5, positive electrode current collector 12 is folded, and as indicated by an arrow AR52, first frame portion 41 is connected to the portion of frame member 40 other than first frame portion 41. Thereby, frame member 40 has an annular shape.

Figure 6:
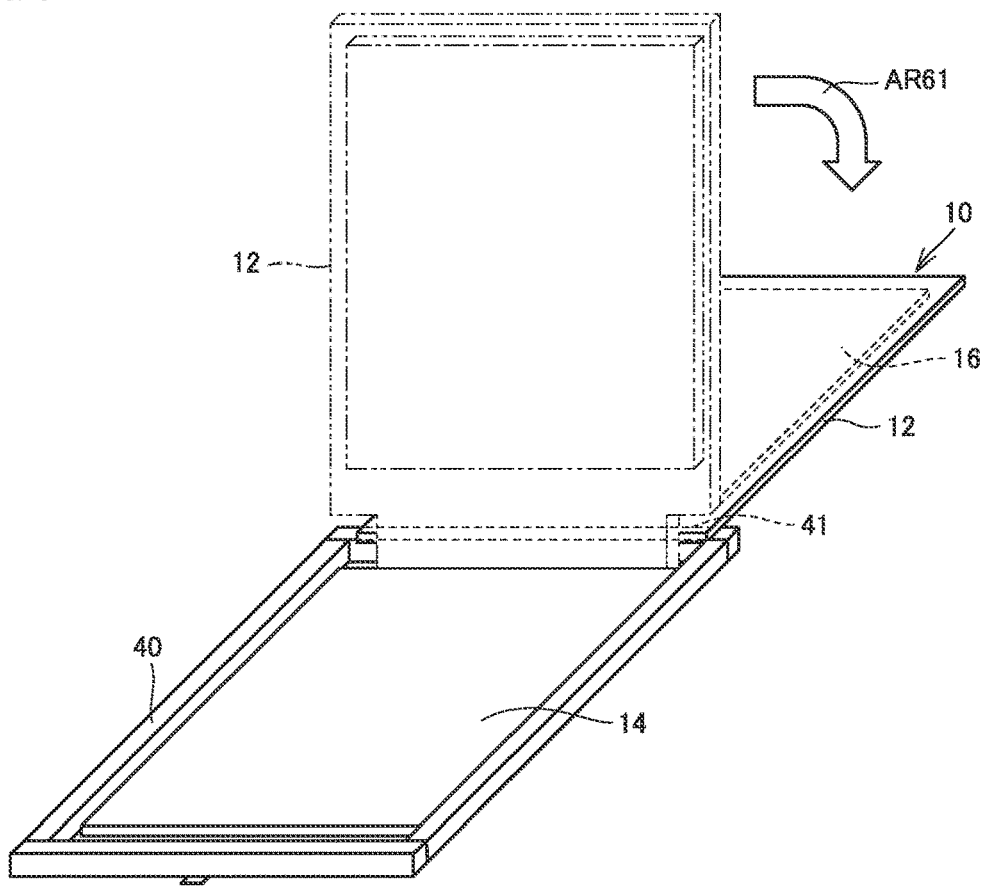
FIG. 6 is a perspective view showing a step of arranging the frame member on the positive electrode member.
Figure 7:
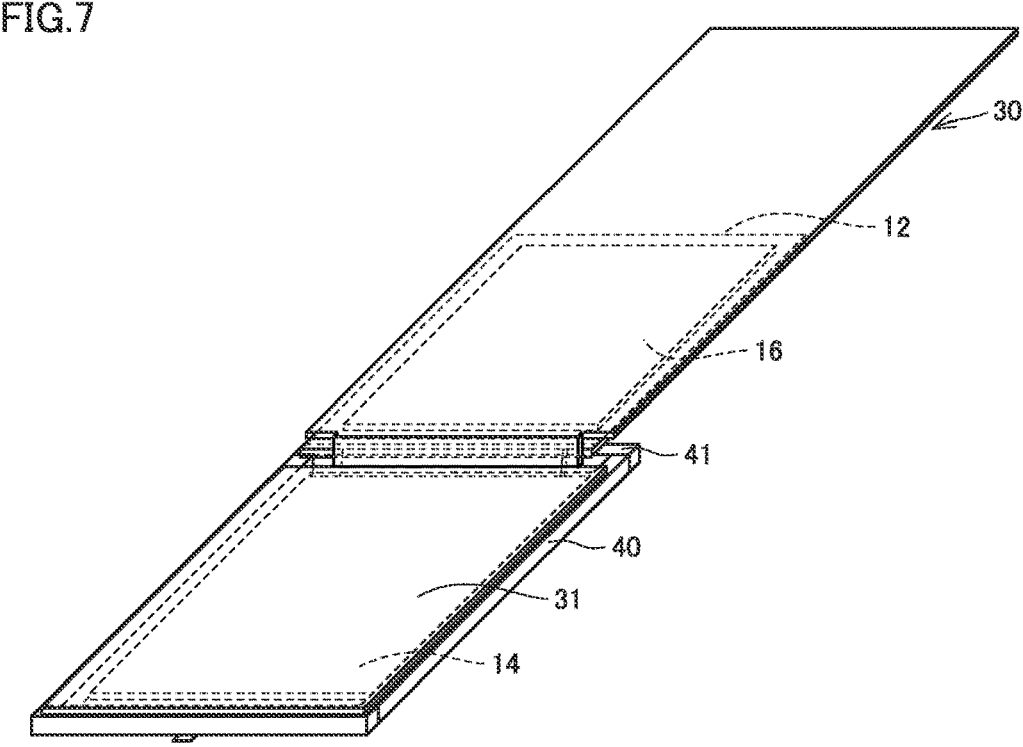
FIG. 7 is a perspective view showing a state where a separator is arranged on the positive electrode member.

Thereafter, as indicated by an arrow AR61 in FIG. 6, positive electrode current collector 12 is folded to overlap on first frame portion 41. Then, as shown in FIG. 7, separator 30 is placed on positive electrode member 10.

Figure 8:
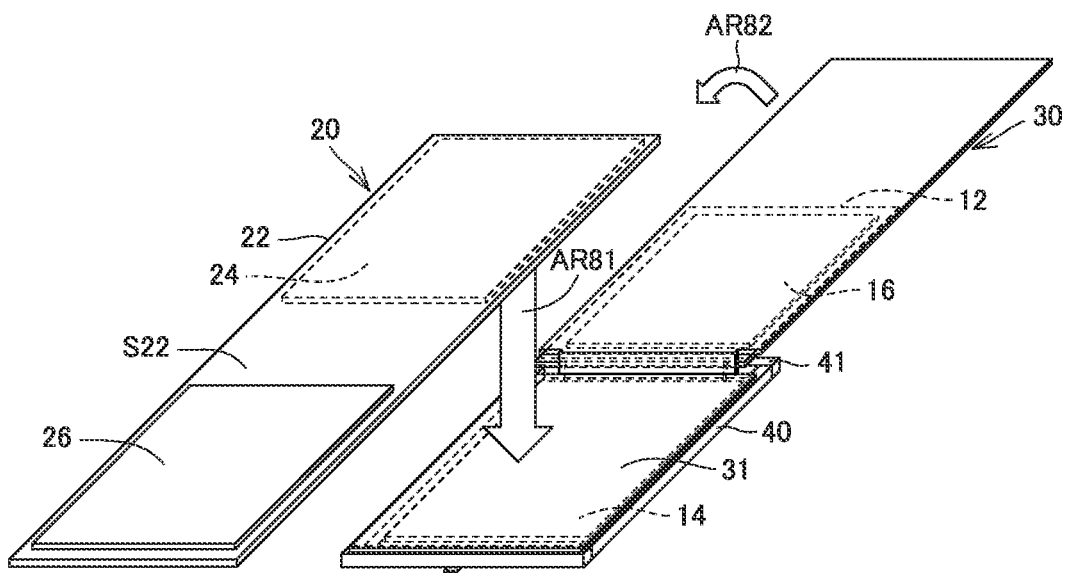
FIG. 8 is a perspective view showing a step of arranging the negative electrode member on the separator.

Then, as indicated by an arrow AR81 in FIG. 8, negative electrode member 20 is placed so that first negative electrode active material layer 24 faces first positive electrode active material layer 14 with first interposed portion 31 being interposed therebetween. Thereby, first electrode E1 is constituted by first positive electrode active material layer 14 and first negative electrode active material layer 24.

Thereafter, as indicated by an arrow AR82 in FIG. 8, separator 30 is folded back so that separator 30 is stacked on second negative electrode active material layer 26, and positive electrode current collector 12 is folded back so that second positive electrode active material layer 16 overlaps with first negative electrode active material layer 24.

Figure 9:
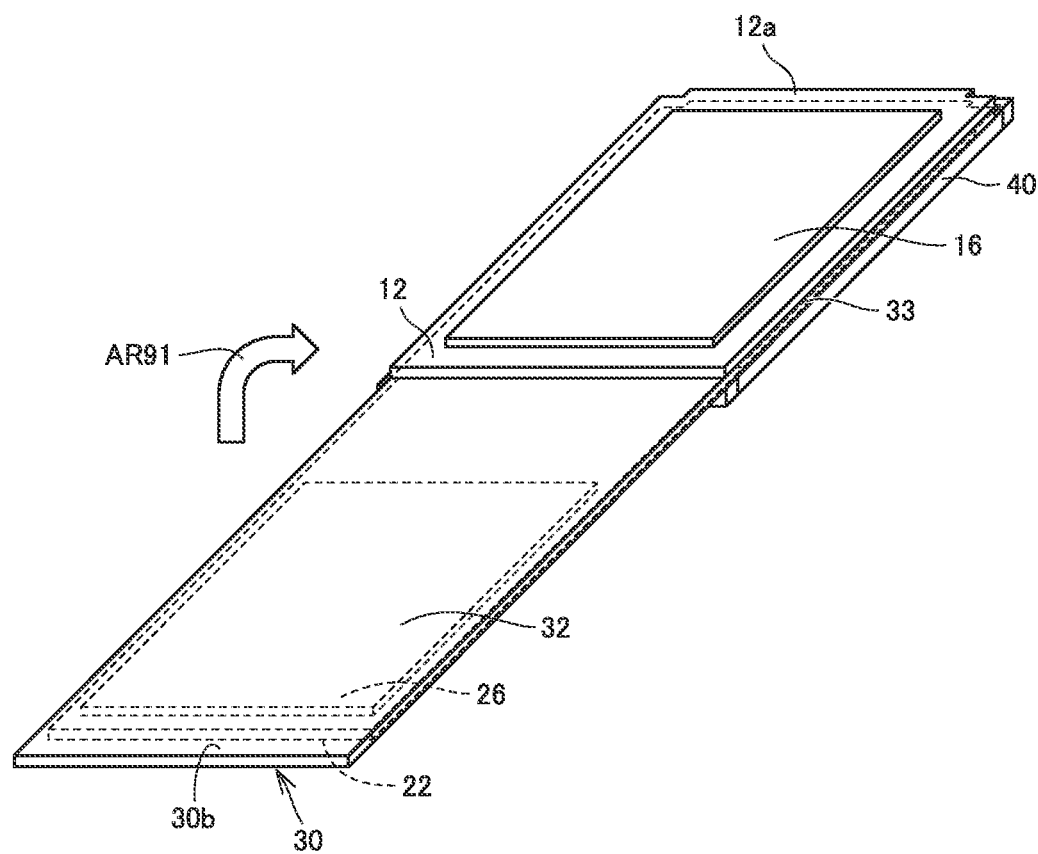
FIG. 9 is a perspective view showing a state where the separator and the positive electrode member are folded back.
Figure 10:
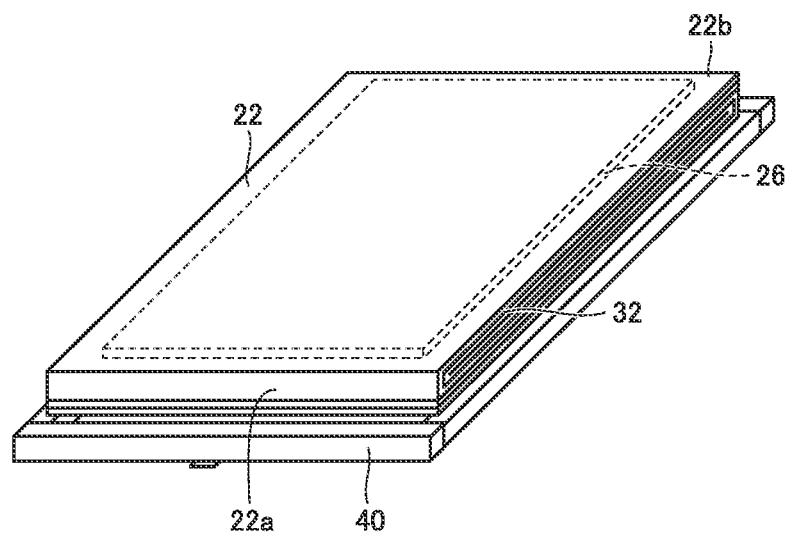
FIG. 10 is a perspective view showing a state where the separator and the negative electrode member are folded back.

Then, as indicated by an arrow AR91 in FIG. 9, separator 30 is folded back so that second interposed portion 32 overlaps on second positive electrode active material layer 16, and negative electrode current collector 22 is folded back so that second negative electrode active material layer 26 faces second positive electrode active material layer 16 with second interposed portion 32 being interposed therebetween. Thereby, second electrode E2 is constituted by second positive electrode active material layer 16 and second negative electrode active material layer 26.

As described above, in battery module 1 in the present embodiment, since first electrode E1 constituted by first positive electrode active material layer 14 and first negative electrode active material layer 24, and second electrode E2 constituted by second positive electrode active material layer 16 and second negative electrode active material layer 26 are connected in parallel with each other, output is improved when compared with a case where electrodes E1 and E2 are connected in series. Further, since first electrode E1 and second electrode E2 are stacked in the direction in which first positive electrode active material layer 14 and second positive electrode active material layer 16 face each other, expansion of the mounting area is suppressed. Accordingly, in this battery module 1, both an increased capacity and an improved output are achieved within a predetermined mounting area.

Here, structures of comparative examples relative to the present embodiment will be described with reference to FIGS. 11 and 12.

Figure 11:
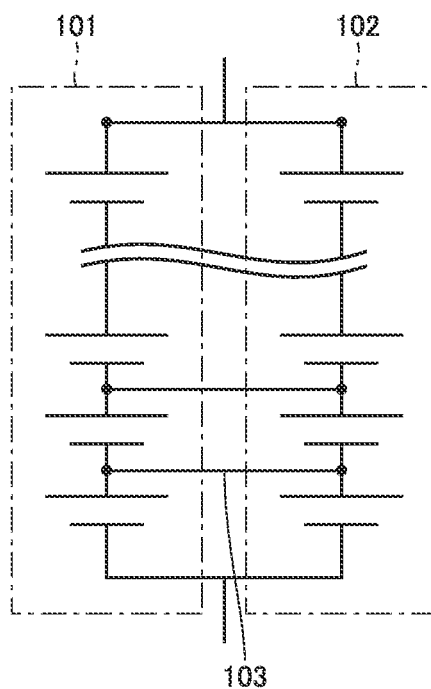
FIG. 11 is a view schematically showing a circuit configuration in a comparative example.

FIG. 11 is a circuit diagram in a case where bipolar batteries having a conventional structure are connected in parallel. When bipolar batteries 101 and 102 are connected in parallel in this manner, a potential difference of about 10%, for example, may occur between portions which should have a potential equal to each other, due to a difference in current-carrying resistance between bipolar batteries 101 and 102. Accordingly, in the structure of this comparative example, an exclusive wire 103 for a circulation current is required outside the batteries.

Figure 12:
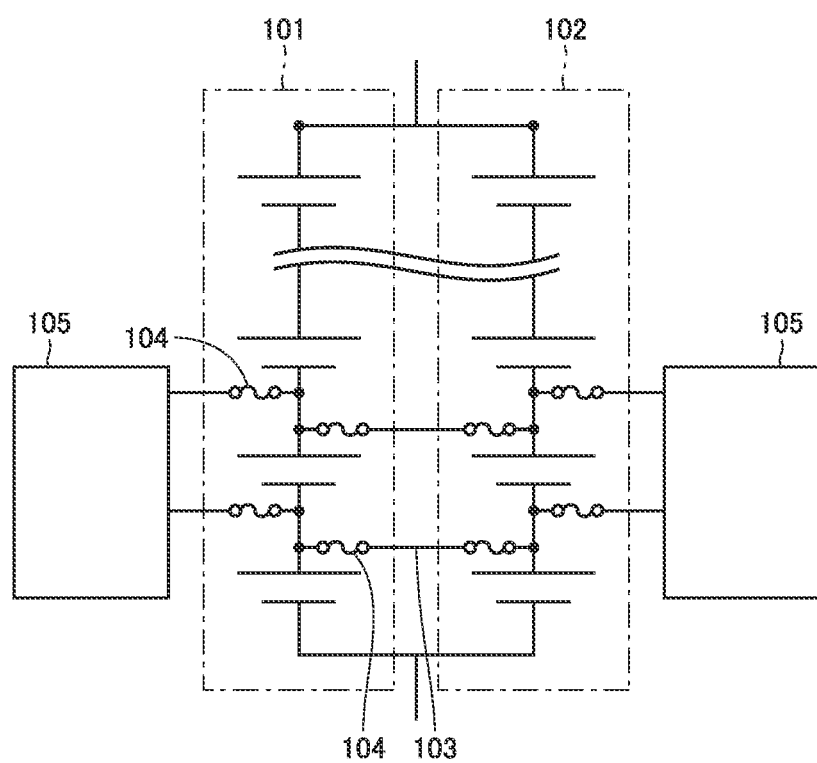
FIG. 12 is a view schematically showing a circuit configuration in a comparative example.

Further, as shown in FIG. 12, a fuse 104 for detecting a break of exclusive wire 103, and a voltage detection unit 105 are also required. This leads to a complicated structure of a battery module, and an increased cost.

In contrast, in the present embodiment, the areas of positive electrode current collector 12 and negative electrode current collector 22 are sufficiently secured, and thus it is unnecessary to provide a fuse and the like. This avoids complication of the structure of battery module 1.

Second Embodiment

Next, a configuration of positive electrode member 10 and negative electrode member 20 of battery module 1 in a second embodiment of the present disclosure will be described with reference to FIG. 13. It should be noted that, in the second embodiment, only portions different from those in the first embodiment will be described, and the description of the structure, function, and effect which are the same as those in the first embodiment will not be repeated.

In the present embodiment, three positive electrode active material layers and three negative electrode active material layers are stacked. That is, battery module 1 in the present embodiment has three electrodes E1 to E3.

Positive electrode member 10 further has a third positive electrode active material layer 18, and negative electrode member 20 further has a third negative electrode active material layer 28. Third positive electrode active material layer 18 and third negative electrode active material layer 28 constitute third electrode E3.

Positive electrode active material layers 14, 16, and 18 are provided on first main surface 12S1 of positive electrode current collector 12. First negative electrode active material layer 24 is provided on first main surface 22S1 of negative electrode current collector 22, and second negative electrode active material layer 26 and third negative electrode active material layer 28 are provided on second main surface 22S2 of negative electrode current collector 22.

Figure 13:
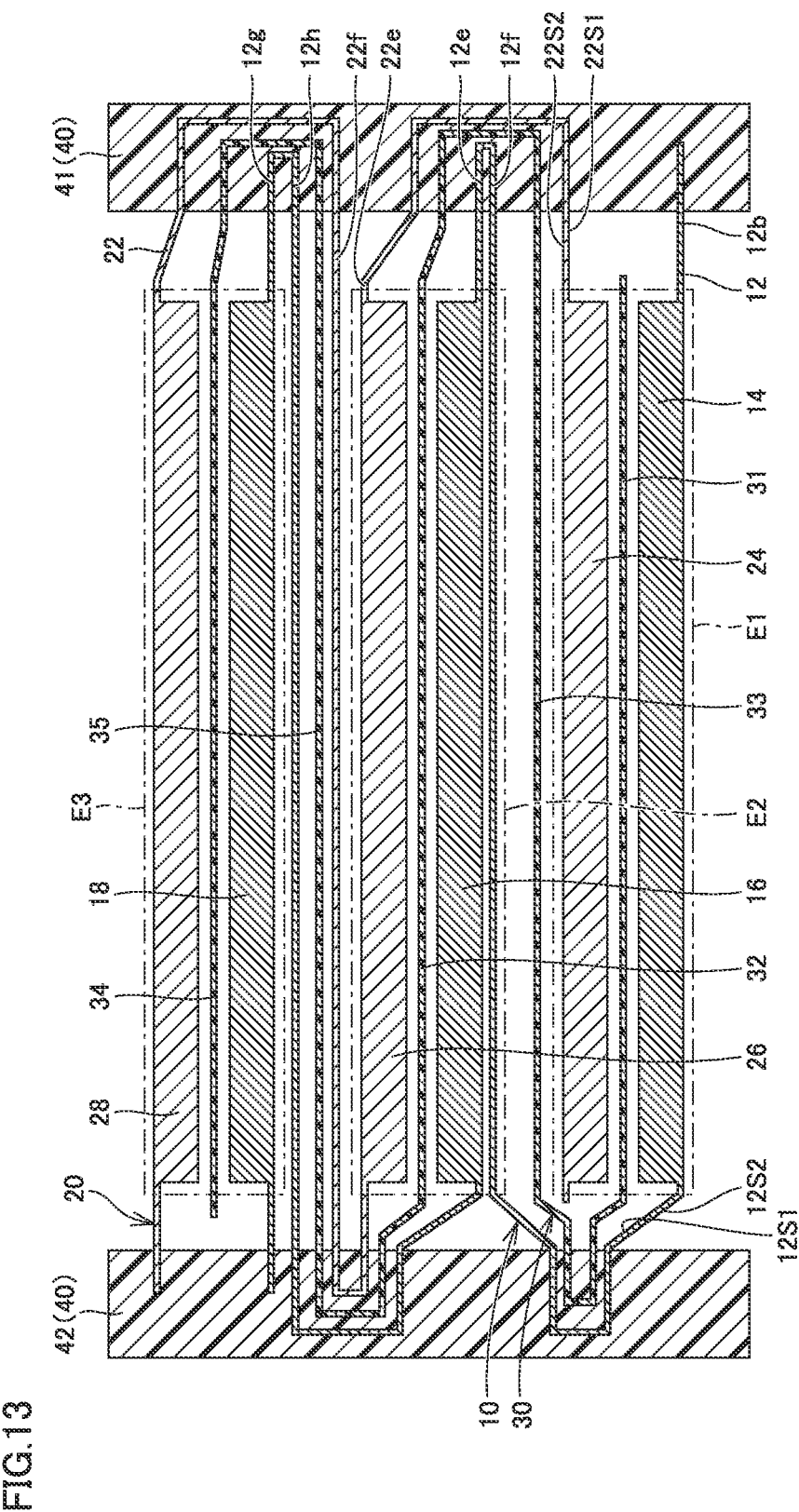
FIG. 13 is a cross sectional view schematically showing a configuration of a positive electrode member and a negative electrode member of a battery module in a second embodiment of the present disclosure.

It should be noted that, in FIG. 13, for description, a gap is formed between a portion 12e of positive electrode current collector 12 which supports second positive electrode active material layer 16 and a portion 12f of positive electrode current collector 12 which faces portion 12e, a gap is formed between a portion 12g of positive electrode current collector 12 which supports third positive electrode active material layer 18 and a portion 12h of positive electrode current collector 12 which faces portion 12g, and a gap is formed between a portion 22e of negative electrode current collector 22 which supports second negative electrode active material layer 26 and a portion 22f of negative electrode current collector 22 which faces portion 22e. Actually, however, portions 12e and 12f are in contact with each other, portions 12g and 12h are in contact with each other, and portions 22e and 22f are in contact with each other.

Separator 30 has a third interposed portion 34 interposed between third positive electrode active material layer 18 and third negative electrode active material layer 28, and another coupling portion 35 which couples second interposed portion 32 and third interposed portion 34.

It should be noted that, also in a case where four or more positive electrode active material layers and four or more negative electrode active material layers are stacked, they are stacked as in the structure shown in FIG. 13.

A person skilled in the art would understand that the exemplary embodiments described above are specific examples of the following aspects.

The battery module in each of the embodiments described above is a battery module with a plurality of electrodes connected in parallel with each other, the battery module including: a positive electrode member having a positive electrode current collector, a first positive electrode active material layer provided on the positive electrode current collector, and a second positive electrode active material layer provided on the positive electrode current collector; a negative electrode member having a negative electrode current collector, a first negative electrode active material layer provided on the negative electrode current collector, and a second negative electrode active material layer provided on the negative electrode current collector; and a separator arranged between the positive electrode member and the negative electrode member, the positive electrode current collector having a positive electrode folded-back portion in which the positive electrode current collector is folded back so that the first positive electrode active material layer and the second positive electrode active material layer are aligned in a thickness direction of the first positive electrode active material layer, the negative electrode current collector having a negative electrode folded-back portion in which the negative electrode current collector is folded back so that the first negative electrode active material layer and the second negative electrode active material layer are aligned in a thickness direction of the first negative electrode active material layer, the first negative electrode active material layer being arranged so as to face the first positive electrode active material layer, thereby constituting a first electrode together with the first positive electrode active material layer, the second negative electrode active material layer being arranged so as to face the second positive electrode active material layer, thereby constituting a second electrode connected in parallel with the first electrode together with the second positive electrode active material layer, the separator having a first interposed portion interposed between the first positive electrode active material layer and the first negative electrode active material layer, and a second interposed portion interposed between the second positive electrode active material layer and the second negative electrode active material layer.

In this battery module, since the first electrode constituted by the first positive electrode active material layer and the first negative electrode active material layer, and the second electrode constituted by the second positive electrode active material layer and the second negative electrode active material layer are connected in parallel with each other, output is improved when compared with a case where the electrodes are connected in series. Further, since the first electrode and the second electrode are stacked in the direction in which the first positive electrode active material layer and the second positive electrode active material layer face each other, expansion of the mounting area is suppressed.

Accordingly, in this battery module, both an increased capacity and an improved output are achieved within a predetermined mounting area.

In addition, preferably, the battery module further includes a frame member made of an insulator.

In this case, preferably, the positive electrode folded-back portion is fixed to the frame member.

With this configuration, relative displacement of the positive electrode member with respect to the frame member is suppressed.

In addition, preferably, the negative electrode folded-back portion is fixed to the frame member.

With this configuration, relative displacement of the negative electrode member with respect to the frame member is suppressed.

In addition, preferably, an end portion of the separator is fixed to the frame member.

With this configuration, relative displacement of the separator with respect to the frame member is suppressed.

In addition, the positive electrode current collector has a first main surface and a second main surface, the first positive electrode active material layer may be provided on the first main surface of the positive electrode current collector, the second positive electrode active material layer may be provided on a portion of the second main surface of the positive electrode current collector which does not overlap with the first positive electrode active material layer in a thickness direction of the positive electrode current collector, the negative electrode current collector has a first main surface and a second main surface, the first negative electrode active material layer may be provided on the first main surface of the negative electrode current collector, and the second negative electrode active material layer may be provided on a portion of the second main surface of the negative electrode current collector which does not overlap with the first negative electrode active material layer in a thickness direction of the negative electrode current collector.

In addition, preferably, the separator further has a coupling portion which passes between the first electrode and the second electrode and couples the first interposed portion and the second interposed portion.

With this configuration, the separator is easily handled when compared with a case where the first interposed portion and the second interposed portion are formed as mutually separate bodies.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A battery module with a plurality of electrodes connected in parallel with each other, the battery module comprising:

a positive electrode member having a positive electrode current collector, a first positive electrode active material layer provided on the positive electrode current collector, and a second positive electrode active material layer provided on the positive electrode current collector, wherein the positive electrode current collector has a first main surface and a second main surface, the first positive electrode active material layer is provided on the first main surface of the positive electrode current collector, and the second positive electrode active material layer is provided on a portion of the second main surface of the positive electrode current collector which does not overlap with the first positive electrode active material layer in a thickness direction of the positive electrode current collector in a state where the positive electrode current collector is not folded, wherein the first main surface of the positive electrode current collector has a first exposed portion formed in an area overlapping with the second positive electrode active material layer in the thickness direction of the positive electrode current collector and exposing the positive electrode current collector, and, wherein the second main surface of the positive electrode current collector has a second exposed portion formed in an area overlapping with the first positive electrode active material layer in the thickness direction of the positive electrode current collector and exposing the positive electrode current collector;

a negative electrode member having a negative electrode current collector, a first negative electrode active material layer provided on the negative electrode current collector, and a second negative electrode active material layer provided on the negative electrode current collector, wherein the negative electrode current collector has a first main surface and a second main surface, the first negative electrode active material layer is provided on the first main surface of the negative electrode current collector, and the second negative electrode active material layer is provided on a portion of the second main surface of the negative electrode current collector which does not overlap with the first negative electrode active material layer in a thickness direction of the negative electrode current collector in a state where the negative electrode current collector is not folded, wherein the first main surface of the negative electrode current collector has a first exposed portion formed in an area overlapping with the second negative electrode active material layer in the thickness direction of the negative electrode current collector and exposing the negative electrode current collector, and wherein the second main surface of the negative electrode current collector has a second exposed portion formed in an area overlapping with the first negative electrode active material layer in the thickness direction of the negative electrode current collector and exposing the negative electrode current collector; and a separator arranged between the positive electrode member and the negative electrode member, the positive electrode current collector having a positive electrode folded-back portion in which the positive electrode current collector is folded back so that the first positive electrode active material layer and the second positive electrode active material layer are aligned in a thickness direction of the first positive electrode active material layer, the negative electrode current collector having a negative electrode folded-back portion in which the negative electrode current collector is folded back so that the first negative electrode active material layer and the second negative electrode active material layer are aligned in a thickness direction of the first negative electrode active material layer, the first negative electrode active material layer being arranged so as to face the first positive electrode active material layer, thereby constituting a first electrode together with the first positive electrode active material layer, the second negative electrode active material layer being arranged so as to face the second positive electrode active material layer, thereby constituting a second electrode connected in parallel with the first electrode together with the second positive electrode active material layer, the separator having:
- a first interposed portion interposed between the first positive electrode active material layer and the first negative electrode active material layer, and
- a second interposed portion interposed between the second positive electrode active material layer and the second negative electrode active material layer, wherein the negative electrode folded-back portion is arranged on a side opposite to the positive electrode folded-back portion with respect to the first and second electrodes, and wherein the separator has a coupling portion which passes between the first electrode and the second electrode and couples the first interposed portion and the second interposed portion, the coupling portion having:
- a passing element which passes between the first electrode and the second electrode,
- a first fold-back element which is folded between the first negative electrode active material layer and the positive electrode folded-back portion and connects the passing element and the first interposed portion, and
- a second fold-back element which is folded between the second positive electrode active material layer and the negative electrode folded-back portion and connects the passing element and the second interposed portion, wherein the passing element passes between the first exposed portion of the positive electrode current collector and the first exposed portion of the negative electrode current collector.

2. The battery module according to claim 1, further comprising a frame member made of an insulator.

3. The battery module according to claim 2, wherein the positive electrode folded-back portion is fixed to the frame member.

4. The battery module according to claim 2, wherein the negative electrode folded-back portion is fixed to the frame member.

5. The battery module according to claim 2, wherein an end portion of the separator is fixed to the frame member.

* * * * *